(12) United States Patent
Chen

(10) Patent No.: US 6,961,235 B2
(45) Date of Patent: Nov. 1, 2005

(54) COMPUTER HOUSING WHICH CAN PREVENT ELECTROMAGNETIC RADIATION LEAKAGE

(75) Inventor: Tao-Min Chen, Taipei Hsien (TW)

(73) Assignee: Wistron Corporation, Hsi-Chih (TW)

( * ) Notice: Subject to any disclaimer, the term of this patent is extended or adjusted under 35 U.S.C. 154(b) by 154 days.

(21) Appl. No.: 10/604,441

(22) Filed: Jul. 21, 2003

(65) Prior Publication Data
US 2004/0105224 A1 Jun. 3, 2004

(30) Foreign Application Priority Data
Nov. 12, 2002 (TW) .............................. 91218140 U

(51) Int. Cl.⁷ ................................................ G06F 1/16
(52) U.S. Cl. ....................... 361/683; 361/686; 361/748
(58) Field of Search ............................... 361/679, 683, 361/686, 748, 816, 818

(56) References Cited

U.S. PATENT DOCUMENTS 6,404,651 B1 * 6/2002 Martin et al. ............... 361/801

* cited by examiner

Primary Examiner—Yean-Hsi Chang
(74) Attorney, Agent, or Firm—Winston Hsu

(57) ABSTRACT

A computer housing which can prevent an electromagnetic radiation leakage includes a frame, a plurality of ribs installed on the frame, and a plurality of brackets each installed between two adjacent ribs. Two adjacent ribs form an expansion slot for accommodating a bracket. Each of the ribs includes at least one front supporting piece and one rear supporting piece. Each of the brackets is superimposed on the front supporting pieces of the adjacent rib and squeezes the rear supporting pieces thereof to prevent a leakage of electromagnetic radiation.

11 Claims, 4 Drawing Sheets

COMPUTER HOUSING WHICH CAN PREVENT ELECTROMAGNETIC RADIATION LEAKAGE

BACKGROUND OF INVENTION

1. Field of the Invention

The present invention relates to a computer housing, and more particularly, to a computer housing for preventing an electromagnetic radiation leakage.

2. Description of the Prior Art

Generally, various kinds of electronic components have been installed in a computer system, and all these electronic devices emit electromagnetic radiation. Moreover, the electromagnetic radiation will be harmful to the computer users and circumstances. It is therefore desirable for the computer manufacturers to shield circuit components to reduce undesirable electromagnetic interference (EMI) with the use of computer housing shields that reflect or dissipate electromagnetic charges and fields.

Computer chassis is often provided with extra circuit card slots to allow for easy expansion of the computer system through the addition of circuit cards. Briefly speaking, all kinds of peripheral equipments can be connected to the computer system by connecting circuit cards to the main board. Generally speaking, those circuit cards, such as FAX enabling demodulation cards, have to be connected to computer system through extra circuit card slots, namely expansion slots, which is mostly installed on the backplane of the computer housing. Therefore, the circuit cards can be inserted into the expansion slots with printed circuit board (PCB) brackets being covered on the expansion slots to communicate with the computer system.

The expansion slots will not be equipped with circuit cards and covered by printed circuit board brackets when a computer is originally shipped or sold. Unless they are shielded, empty slots allow the introduction of dust or other foreign matters into the computer housing, thereby potentially interfering with the performance and life span of the internal circuitry of the computer. Such unshielded empty expansion slots also allow the leakage of electromagnetic (EM) waves generated by the internal circuitry of the computer. Recently, the Federal Communications Commission has imposed limits on the amounts of EM wave emissions released from devices being sold and transported in and around the United States and, therefore, it is desirable to minimize those emissions.

Generally, the empty expansion slots should be covered by brackets. However, nowadays, along with the higher complexity of the electric circuits inside the computer, the amount of electromagnetic radiation is greatly increasing so that lots of queries are raised toward the shielding function of the brackets. Those queries are mainly aimed at the slight gap between the bracket and the computer housing that may cause a leakage of electromagnetic radiation and make the shielding performance of the bracket deteriorated by external forces.

Please refer to FIG. 1, which is a schematic diagram of a computer housing 10 in the prior art. The computer housing 10 comprises a plurality of expansion slots 12 that permit peripherals to connect to a computer system. The computer housing 10 further comprises a plurality of ribs 18 used to separate adjacent expansion slots 12. Typically, the expansion slots 12 of the computer housing 10 should be covered by a plurality of brackets 14 or PCB brackets 15 as shown in FIG. 1. For the sake of clarity, the PCB bracket 15 shown in FIG. 1 does not include a printed circuit board attached thereto, and only a plurality of support arms 32 of the printed circuit board are shown. The embodiment in the prior art as shown in FIG. 1 discloses two ways to fix the brackets 14 and the PCB brackets 15 onto the expansion slots 12 of the computer housing 10. First, the rib 18 may include a supporting hook 16 at one end to hold a bracket 14 to the expansion slot 12, and typically a plurality of screws (not shown) are used to hold the bracket 14 to the other end of the rib 18. The other method to fix the bracket 14 and the PCB bracket 15 onto the computer housing 10 is to install a plurality of openings 20 at one end of the expansion slot 12, and provide the corresponding end of the brackets 14 with a bending tip 22 that can be inserted into the opening 20 for holding the brackets 14. The design of the openings 20 and the bending tip 22 can improve the fixity of the brackets 14. In addition, the above-mentioned two methods can be combined so that the user can easily and quickly fix the brackets 14 between the adjacent ribs 18 of the computer housing 10 and cover the corresponding expansion slot 12. Although the manner of shielding the expansion slots 12 with brackets 14 and/or PCB brackets 15 by the supporting hook 16, the opening 20, and/or bending tip 22 has been proven to be sufficient to block dust and other debris from entering the computer system, such configuration is still inadequate to sufficiently block EM and RF wave emissions.

The prior art as shown in FIG. 1 cannot significantly reduce the slight gap between the bracket 14 and the computer housing 10 that may cause a leakage of electromagnetic radiation. Especially when an external force is applied so as to cause the deformation of the rib 18 or the brackets 14, the gap between the bracket 14 and the computer housing 10 may be deformed by the external force. In order to provide a tighter contact between the computer housing 10 and the brackets 14 as shown in FIG. 1 for sufficiently reducing the existed gap, the industrial circles adopt the following technique as shown in FIG. 2.

Please refer to FIG. 2, which is a schematic diagram of the computer housing 10 shown in FIG. 1 with a plurality of metallic shielding panels 24 attached thereto. The installation of the plurality of metallic shielding panels 24 on the ribs 18 can reduce the gap between the brackets 14 and the ribs 18. The metallic shielding panels 24 can be replaced by plastic gaskets. These metallic shielding panels or gaskets 24 can definitely reduce the gap between the rib 18 and the brackets 14 to provide a sounder shielding function. However, those externally added matters cause some problems. First, the installation of the metallic shielding panels or gaskets 24 will consume additional labor and cost. Moreover, the metallic shielding panel (gasket) 24 may conflict with the bending tip 22 of the brackets 14 during the assembling and dissembling processes, resulting in an inconvenience. In particular, due to the increasing quantities of the expansion slots 12 that lead to narrower and thinner ribs 18 and brackets 14, the ribs 18 and brackets 14 are more easily deformed by inadequate external force. If the rib 18 and the bracket 14 are bent toward the same direction, the gap is still within tolerance. If the rib 18 and the bracket 14 are bent toward different directions, the gap will be aggravated beyond tolerance, and thus the metallic shielding panels (gasket) 24 will no longer be clamped between the brackets 14 and the ribs 18. Therefore, the prior art can not really provide a solution for the leakage of electromagnetic radiation.

There are many patent documents related to the shielding design of the computer housing for preventing a leakage of electromagnetic radiation as above-mentioned embodiments. U.S. Pat. No. 5,067,041, "Apparatus for reducing electromagnetic radiation from a computer device", issued to Cooke et al. teaches some specific shielding designs for various components of the whole computer system. U.S. Pat. Nos. 5,463,532 and 5,679,923, issued to Le and Petitpierre et al. suggest some improvements for the metallic shielding panel as shown in FIG. 2 to achieve easy integration and sound shielding.

In summary, the above-mentioned prior arts have a characteristic in common, that is, they ignore the real cause of the deformation by external forces. That is, the gap between the brackets and the ribs will be aggravated by external forces when the rib and the bracket are bent or twisted toward different directions. Besides, all the prior arts need to install extra components, as metallic sheilding panel, gasket, or supporting hook, for fixing the brackets or for reducing the gap, and all these additional components will bring some bad effects such as increasing cost or inconvenient installation.

SUMMARY OF INVENTION

It is therefore a primary objective of the claimed invention to provide a computer housing to prevent the leakage of electromagnetic radiation without needing additional shielding or fixing components such as the metallic shielding panel to solve the above-mentioned problem.

The claimed invention provides a computer housing. The computer housing comprises a frame, a plurality of ribs installed on the frame wherein two of the adjacent ribs form an expansion slot and each of the rib includes at least one front supporting piece and at least one rear supporting piece, and a plurality of brackets wherein each of the bracket is superimposed on the front supporting pieces of the adjacent ribs and squeeze the rear supporting pieces of the adjacent ribs to prevent a leakage of electromagnetic radiation.

The advantage of the claimed invention is that there exists a height difference between the front supporting piece and the rear supporting piece of each rib so that a bracket can be detachably accommodated between the front supporting pieces and the rear supporting pieces of the adjacent ribs.

The advantage of the claimed invention is that a frame and a plurality of ribs are formed in one piece, and the adjacent ribs will clamp the bracket for preventing the deformation caused by external forces.

These and other objectives of the claimed invention will become obvious to those of ordinary skill in the art after reading the following detailed description of the preferred embodiment, which is illustrated in the various figures and drawings.

DETAILED DESCRIPTION

Figure 1:
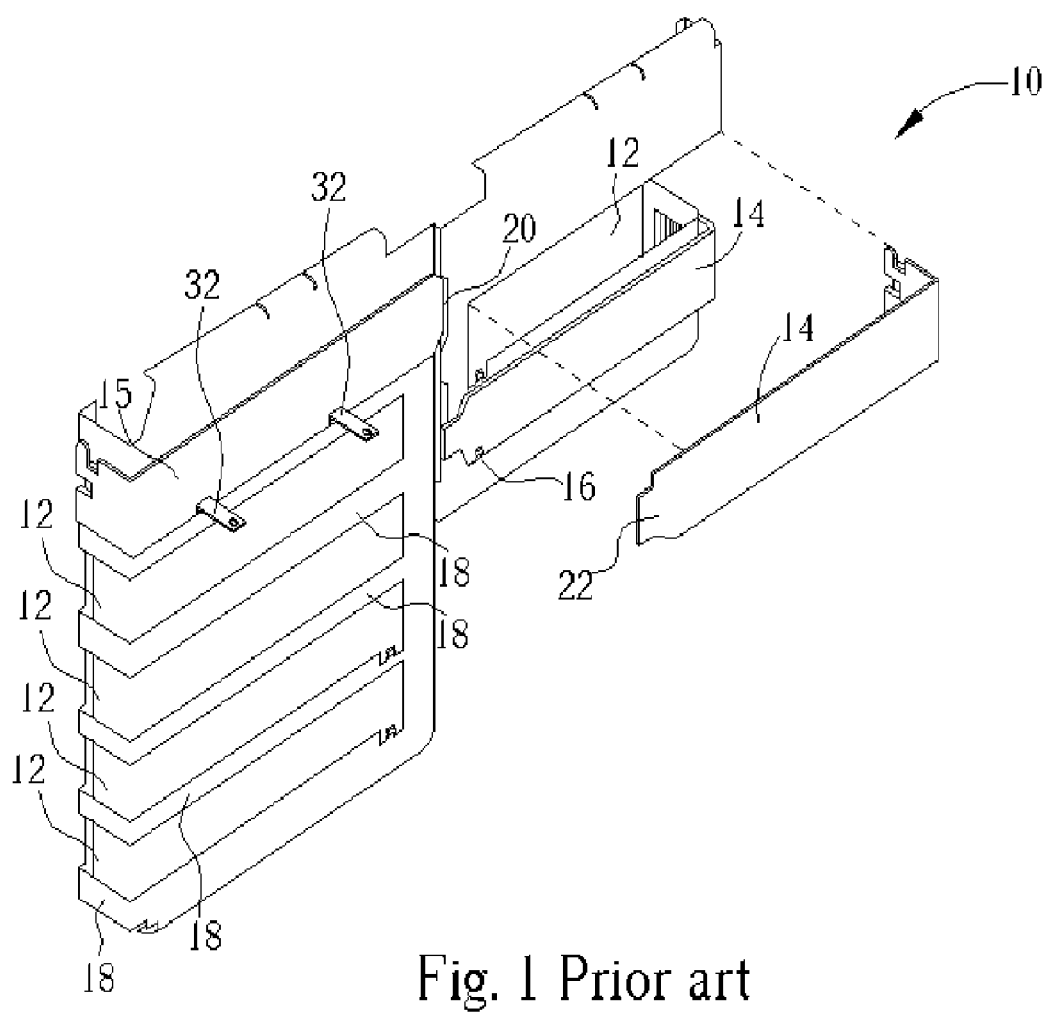
FIG. 1 is a schematic diagram of an embodiment of a prior computer housing.
Figure 2:
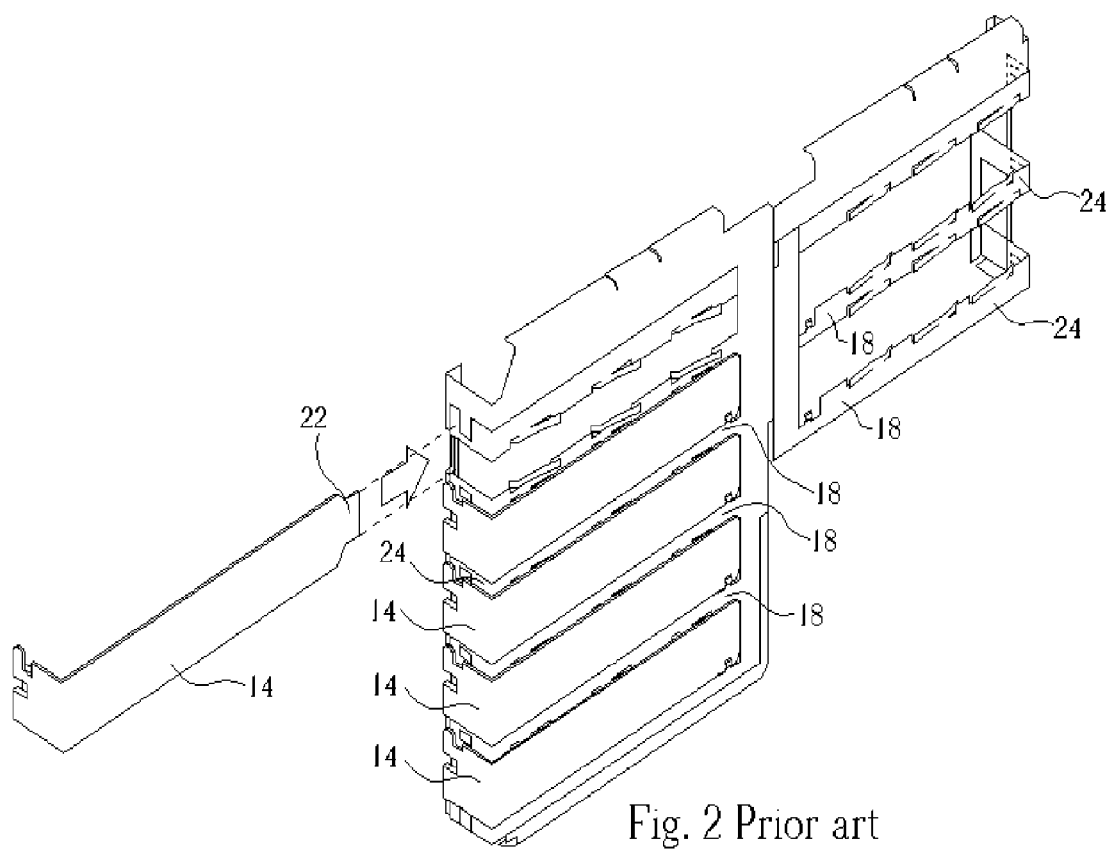
FIG. 2 is a schematic diagram of another embodiment of the prior computer housing.
Figure 3:
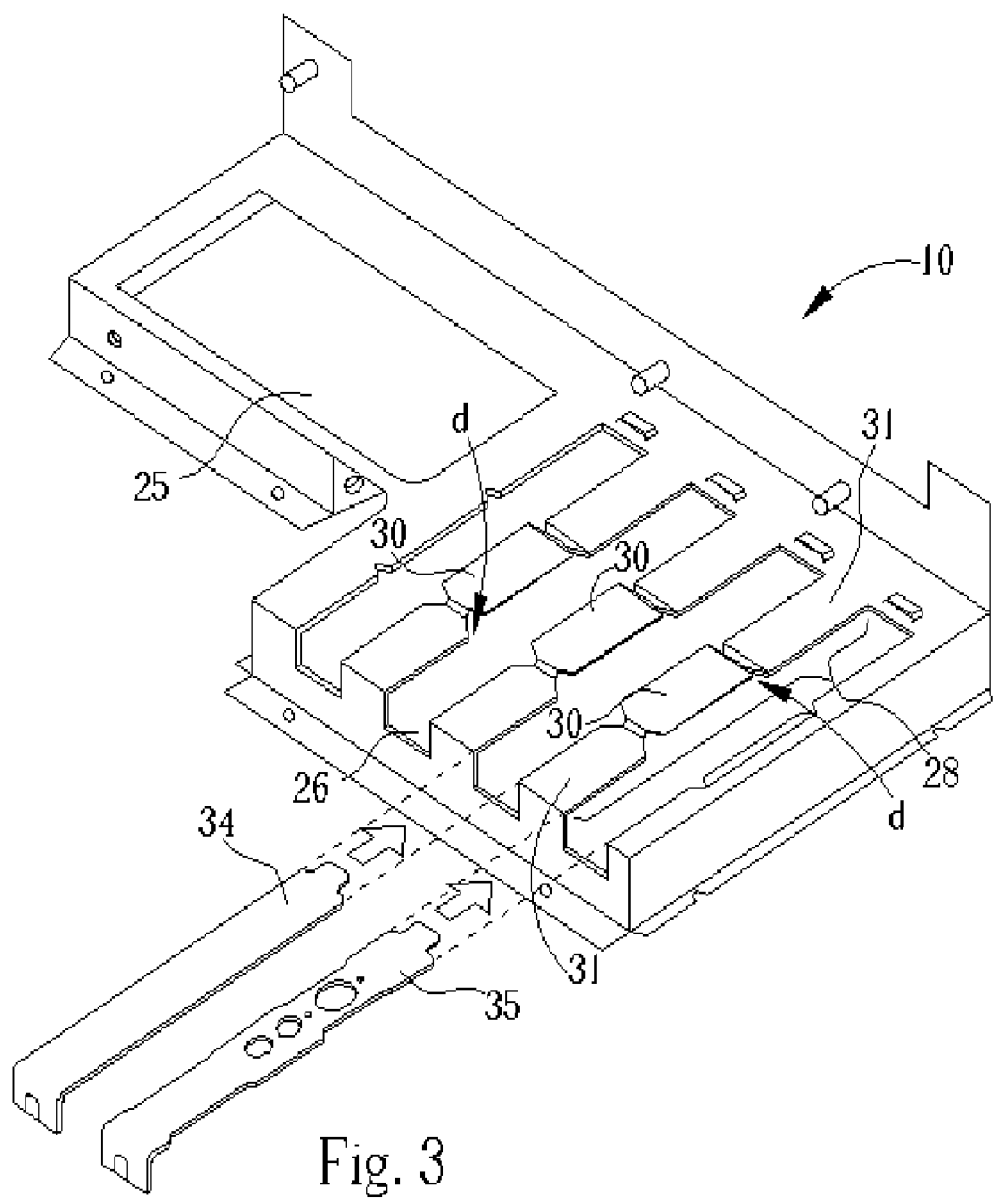
FIG. 3 is a schematic diagram of an embodiment of a computer housing according to the present invention.

Please refer to FIG. 3, which is a schematic diagram of a computer housing 10 according to the present invention. The computer housing 10 comprises a frame 25 and a plurality of ribs 28 installed on the frame 25 wherein two of the adjacent ribs 28 form an expansion slot 26. The plurality of expansion slots 26 can be used to connect peripherals to the computer system. Typically, the expansion slots 26 should be covered with a plurality of brackets 34 or PCB brackets 35. In the embodiment as shown if FIG. 3, each rib 28 comprises two front supporting pieces 31 and a rear supporting piece 30. The rear supporting piece 30 is connected between the two front supporting pieces 31. The two front supporting pieces 31 of the rib stand coplanar, and the rear supporting piece 30 stands on a different plane with the front supporting pieces 31. There exists a height difference d between the front supporting pieces 31 and the rear supporting piece 30 of each rib 28 as shown in FIG. 3, and a thickness of each bracket 34 is almost equivalent to but slightly less than the height difference d so that the bracket 34 can be detachably installed between the front supporting pieces 31 and the rear supporting pieces 30 of adjacent ribs 28. In other words, when the user wants to install the bracket 34 or the PCB bracket 35 between two adjacent rib 28, the user only needs to superimpose the bracket 34 or the PCB bracket 35 on the front supporting pieces 31 of adjacent ribs 28, and push the bracket 34 or the PCB bracket 35 inwards to fit the height difference d so that the bracket 34 is superimposed on the front supporting pieces 31 of the adjacent ribs 28, and squeeze the rear supporting pieces 30 of the adjacent ribs 28. The user can also remove the bracket 34 from the adjacent ribs 28 by following a reverse procedure to how the bracket 34 is installed onto the computer housing 10.

In the embodiment of the computer housing 10, the frame 25 and the plurality of rib 28 that include the front supporting pieces 31 and the rear supporting pieces 30 are formed in one piece. The embodiment of the computer housing 10 requires no metallic shielding panel. In addition, because the thickness of each bracket 34 is almost equivalent to the height difference d, each bracket 34 can be tightly clamped between the adjacent ribs 28 so that ribs 28 and the brackets 34 will be bent or twisted toward the same direction under an intense external force. Therefore, the slight gap between the brackets 34 and the ribs 28 will not increased. Please refer to FIG. 4, which is a schematic diagram showing the computer housing 10 with the PCB brackets 35 being installed thereon. For the sake of clarity, the PCB bracket 35 does not include a printed circuit board attached thereto, and only a plurality of support arms 36 of the printed circuit board are shown.

Figure 4:
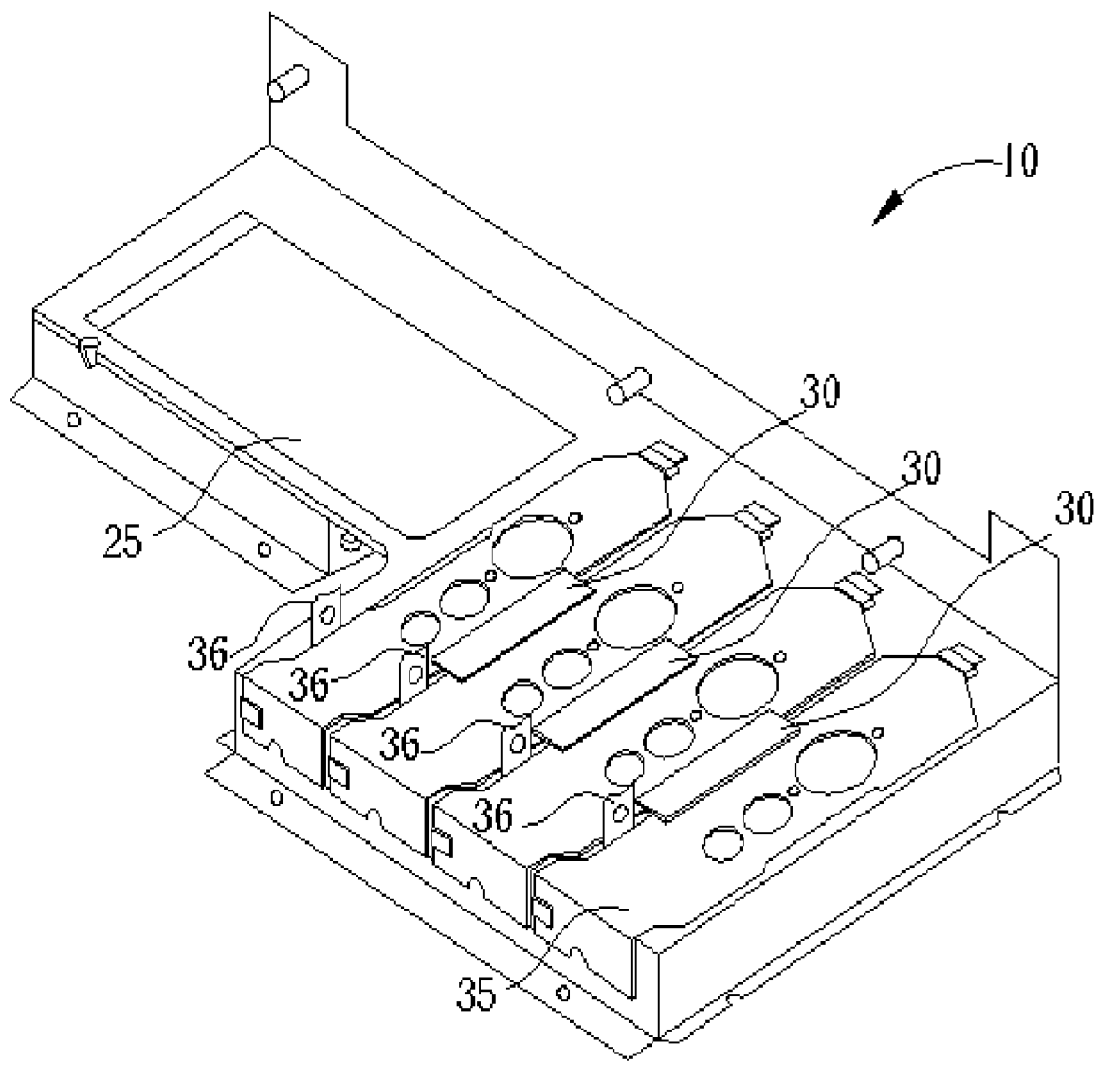
FIG. 4 is a schematic diagram of another embodiment of the computer housing according to the present invention.

The embodiment as shown in FIG. 3 and FIG. 4 are preferred embodiments in the present invention. During the manufacturing process, each rib 28 only needs to include at least a front supporting piece 31 and a rear supporting piece 30. That is, the quantities of the front supporting piece 31 and the rear supporting pieces 30 of each rib 28 will not be limited as long as the brackets 34 can be tightly clamped between the adjacent ribs 28 and the height difference is adequate for accommodating the brackets.

Compared with the prior art, the present invention makes use of a height difference between the front supporting piece and the rear supporting piece of each rib so that a bracket can be detachably clamped between the front supporting pieces and the rear supporting pieces of adjacent ribs. Therefore, the deformation of the gap between the ribs will not be aggravated by external forces and the bracket can perfectly prevent a leakage of electromagnetic radiation. Moreover, the present invention requires no additional shielding or fixing components such as the metallic shielding panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer housing comprising:
   a frame;
   a plurality of ribs installed on the frame, wherein two of adjacent ribs form an expansion slot and each of the ribs includes a plurality of front supporting pieces and at least one rear supporting piece arranged in alternation; and
   a plurality of brackets, wherein each of the brackets is squeezed between the front supporting pieces and the rear supporting piece of each of the adjacent ribs forming the expansion slot to prevent a leakage of electromagnetic radiation.

2. The computer housing of claim 1, wherein the front supporting pieces and the rear supporting piece of each rib are formed in one piece.

3. The computer housing of claim 1, wherein a height difference is occurred between the front supporting pieces and the rear supporting piece of each rib wherein the height difference is almost equivalent to a thickness of the bracket for accommodating the bracket.

4. The computer housing of claim 1, wherein after the bracket is disassembled, the expansion slot can accommodate an add-on card.

5. The computer housing of claim 1, wherein the frame and the plurality of ribs are formed in one piece.

6. The computer housing of claim 1, wherein each of the ribs comprises two front supporting pieces and one rear supporting piece, and the rear supporting piece is connected between the two front supporting pieces.

7. A computer comprising:
   a housing;
   a plurality of ribs installed on a frame of the housing, wherein two adjacent ribs form an expansion slot and each of the rib includes a plurality of co-planar front supporting pieces forming part of a first plane and at least one rear supporting piece forming a second plane, the front supporting pieces and the rear supporting piece arranged in alternation along the rib; and
   a bracket installed in the expansion slot and squeezed between the first plane and the second plane to prevent a leakage of electromagnetic radiation.

8. The computer of claim 7 wherein the front supporting pieces and the rear supporting piece of each rib are formed in one piece.

9. The computer of claim 7 wherein a distance approximately equivalent to a thickness of the bracket separates the first plane from the second plane.

10. The computer of claim 7 wherein the frame and the plurality of ribs are formed in one piece.

11. The computer of claim 7 wherein the bracket comprises a printed circuit board.

* * * * *